Dec. 31, 1929.   G. W. BAKER ET AL   1,742,155
MANUFACTURE OF EXPANDED METAL
Filed March 1, 1926   8 Sheets-Sheet 3

Inventors:
George W. Baker and James H. Lean
By Fisher, Earle, Clapp & Soans
Attys.

Dec. 31, 1929.  G. W. BAKER ET AL  1,742,155
MANUFACTURE OF EXPANDED METAL
Filed March 1, 1926  8 Sheets-Sheet 5

Dec. 31, 1929.  G. W. BAKER ET AL  1,742,155
MANUFACTURE OF EXPANDED METAL
Filed March 1, 1926  8 Sheets-Sheet 8

Inventors:
George W. Baker and James H. Lean
By Fisher, Parle, Clapp & Soans Attys.

Patented Dec. 31, 1929

1,742,155

UNITED STATES PATENT OFFICE

GEORGE W. BAKER, OF CHICAGO, ILLINOIS, AND JAMES H. DEAN, OF LUDINGTON, MICHIGAN, ASSIGNORS TO NORTHWESTERN EXPANDED METAL COMPANY, OF CHICAGO, ILLINOIS, A CORPORATION OF ILLINOIS

MANUFACTURE OF EXPANDED METAL

Application filed March 1, 1926, Serial No. 91,564.

The present invention relates to the manufacture of expanded sheet metal and seeks to provide an improved method and apparatus for making an improved form of expanded sheet metal having longitudinal, unexpanded strips or ribs and longitudinal panels expanded to form inclined bond, diamond mesh. Heretofore, in the manufacture of metal lath having diamond mesh expanded panels and unexpanded strips or ribs, it has been necessary either to stretch the strands, or, if the expansion has been effected by bending and without stretching the strands, to distort or shorten the sheets and strips. In accordance with the present invention, the sheets are cut or slashed in narrow zones or panels, preferably of substantially the same or slightly less width than the intermediate strips, to thereby form short, inclined rows of strands and staggered bonds with the strands and bonds in adjacent panels oppositely inclined, and the expansion is effected, without shortening the panels or the strips, by bending the connecting strands of the mesh sections through a slight angle and such that there is no substantial distortion of the sheet.

The foregoing and other features of the invention are hereinafter more particularly set forth, illustrated in the accompanying drawing and more particularly pointed out in the appended claims.

Figure 1:
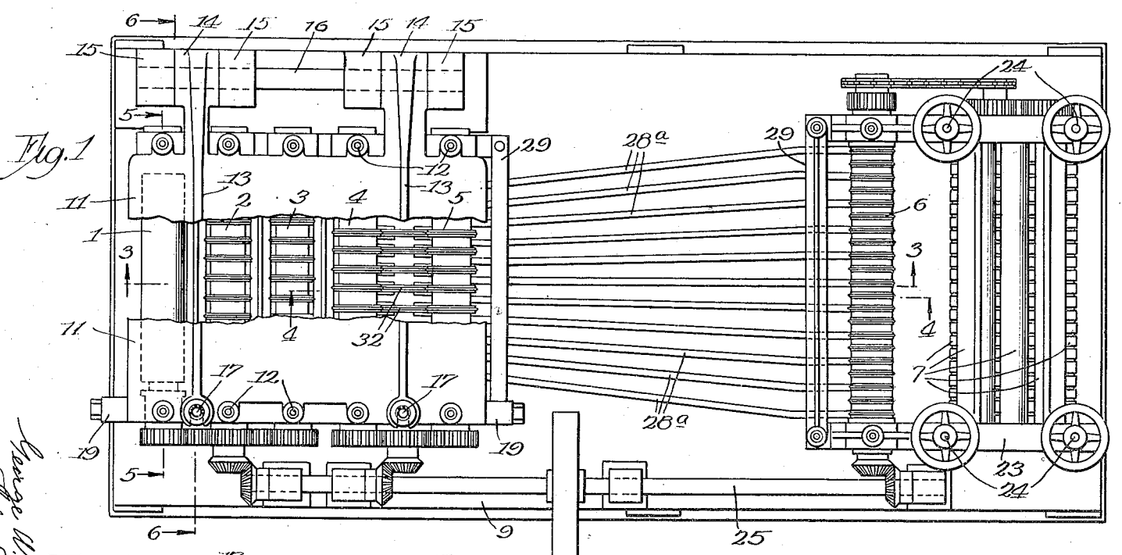
Fig. 1 is a plan view of the improved machine with parts broken away.
Figure 2:
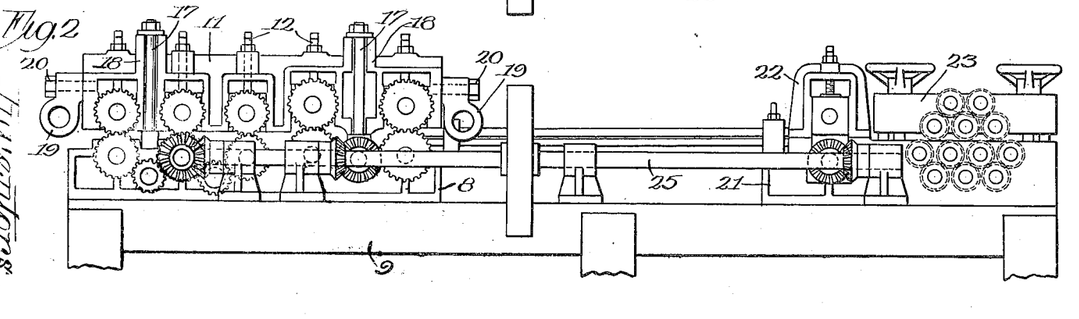
Fig. 2 is a side elevation.
Figure 5:
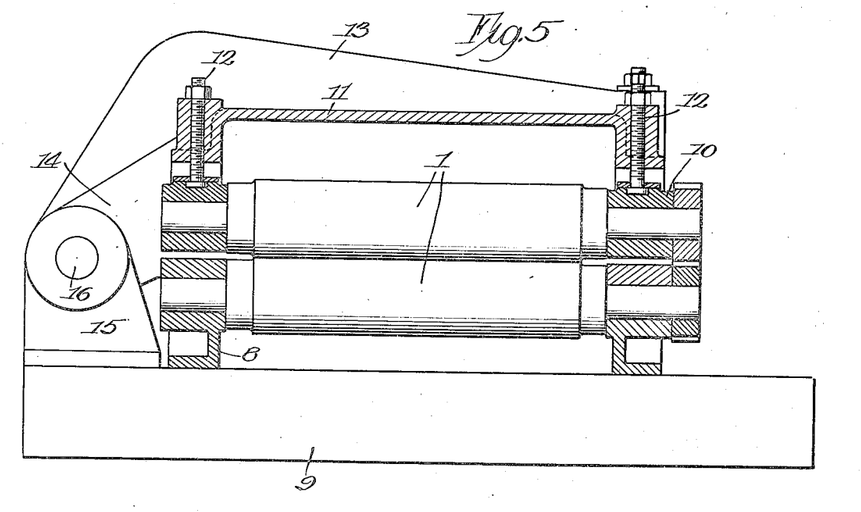
Figs. 5 and 6 are cross sections taken on the lines 5—5 and 6—6 respectively of Fig. 1.

The improved machine, in the preferred form shown, comprises a pair of feed rolls 1, two pairs of rolls 2 and 3 constituting a set of rolls for beading the marginal and odd-numbered ribs of the sheet, two pairs of rolls 4 and 5 for beading the intermediate or even-numbered strips, a pair of feeding and setting rolls 6 and a set of leveling rolls 7. The pairs of rolls 1 to 5 inclusive are arranged at the forward end of the machine, the lower roll of each pair being mounted in suitable bearings carried by brackets 8 upon a bed plate 9, and the upper roll of each pair in boxes 10 that are adjustably mounted in guideways formed in the opposite sides of a head 11. Bolts 12 (see Fig. 5) are connected to the boxes and extend through the portions of the head above the box guideways or seats and serve to adjust the rolls so that they will properly engage the metal sheets. The brackets 8 and head 11 form a housing for the pairs of rolls 1 to 5 inclusive and preferably, as shown, the head 11 is provided with transverse stiffening ribs 13 and projecting hinge portions 14 which extend between brackets 15 on the bed plate and are pivotally connected thereto by a hinge pintle 16. Normally the head 11 rests upon the bracket 8 adjacent its hinge and upon collars or enlarged portions of a pair of heavy bolts 17 fixed to the opposite bracket 8 and extending vertically through slotted portions 18 of the head. Nuts on the upper ends of the bolts 17 normally clamp the head 11 in position. At the side of the head farthest from its hinge it is provided with eyes 19 pivotally connected thereto by bolts 20. By removing the nuts on the bolts 17 and engaging suitable hoisting tackle with the eyes 19, the head and the upper rolls may be readily swung upwardly to free the metal engaged by the rolls as is at times desirable in case the metal becomes jammed or broken during the expanding operation. Preferably the pivot bolts 20 are so situated that the center of gravity of the head and rolls carried thereby will lie in a plane extending through these bolts and the hinge pintle 16, so that the head and the rolls can be conveniently raised to vertical position directly above the hinge pintle.

The rolls 6 and leveling rolls 7 are arranged at the rear end of the machine, the lower rolls being mounted in suitable brackets 21 carried by the bed plate. The upper rolls 6 are mounted in adjustable boxes carried by brackets 22. The set of leveling rolls has four lower rolls mounted as stated in the brackets 21, and three relatively staggered upper rolls carried in a head or frame 23. Adjusting screws 24 arranged at the four corners of the head or frame 23, serve to relatively adjust the leveling rolls. All of the rolls, as clearly shown in Figs. 1 and 2, are driven at the same peripheral speed by suitable gearing from a main drive shaft 25.

Figure 3:
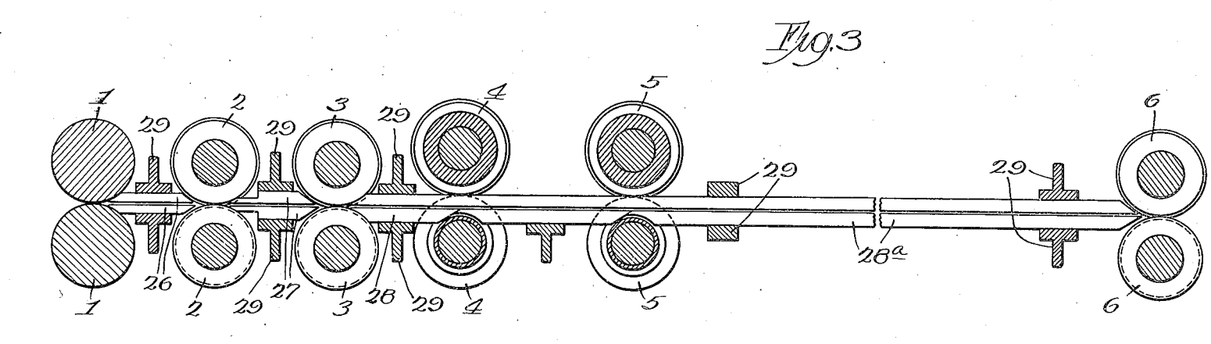
Figs. 3 and 4 are detail views with parts shown in longitudinal section on the lines 3—3 and 4—4 respectively of Fig. 1, and illustrating, somewhat diagrammatically, the feeding and strip beading rolls and the guides for the strips, Fig. 3 showing the guides for the marginal and the alternate odd-numbered strips of the sheet, and Fig. 4 those for the intermediate or even-numbered strips.

A series of guides 26, 27, and 28 for the marginal and the alternate or odd-numbered ribs of the sheets are arranged between the pairs of rolls 1 and 2, 2 and 3, and 3 and 6, respectively, as most clearly shown in Fig. 3. These guides consist of upper and lower rails mounted on cross supports or bars 29 and providing suitable passes for the odd-numbered ribs of the sheet. The cross bars or supports 29 are fixed to suitable ledges on the brackets 8 and 21 (see Figs. 1 and 6) and are detachably connected thereto by bolts 30, so that the upper supports and the upper rails of the guides can be readily removed. The receiving ends of the guides 26, 27, and 28 are arranged closely adjacent the surfaces of the rolls 1, 2, and 3 respectively, so as to properly strip the metal therefrom.

Figure 4:
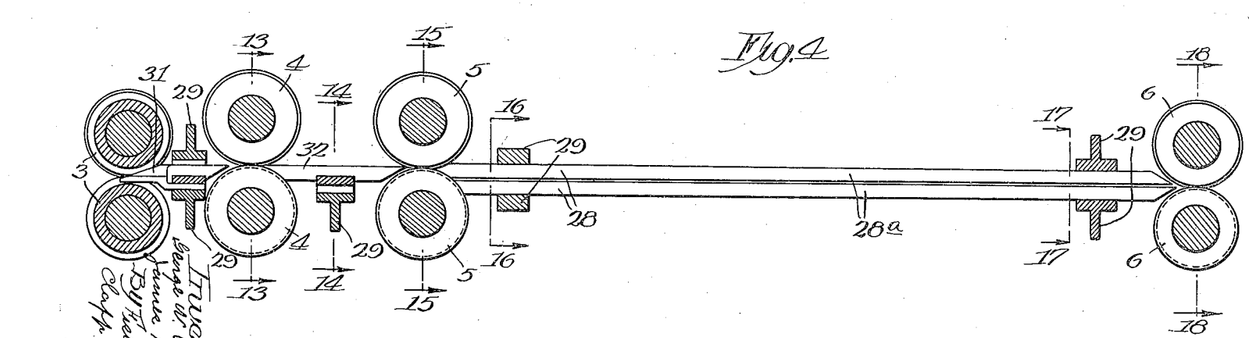
Figure 6:
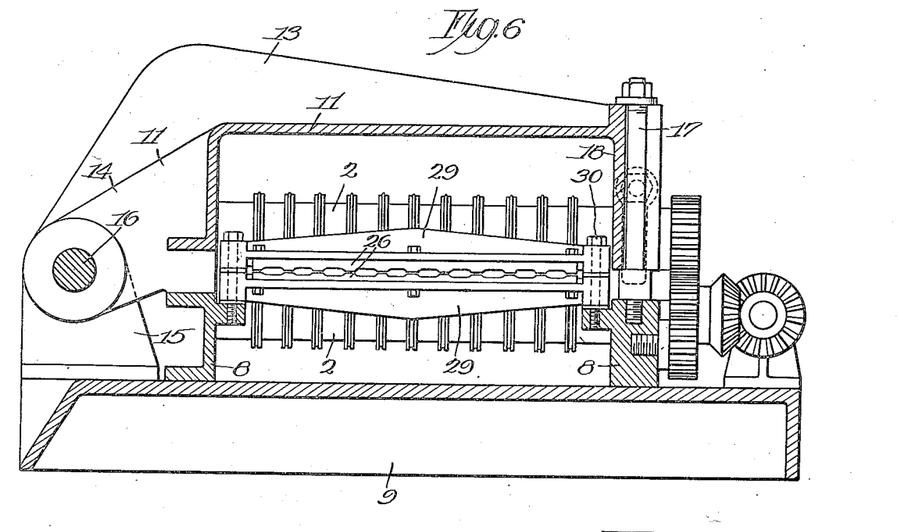
Figure 8:
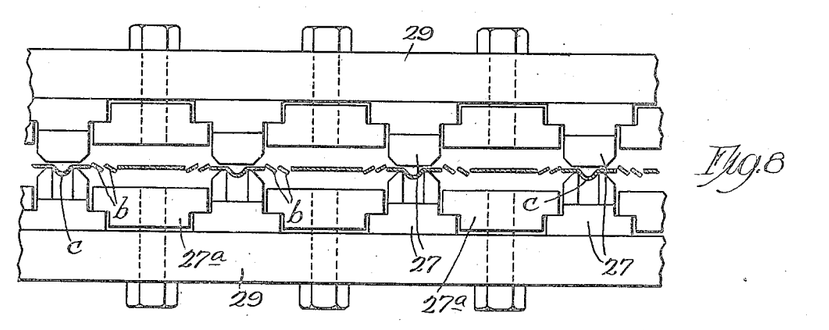
Figures 11, 12:
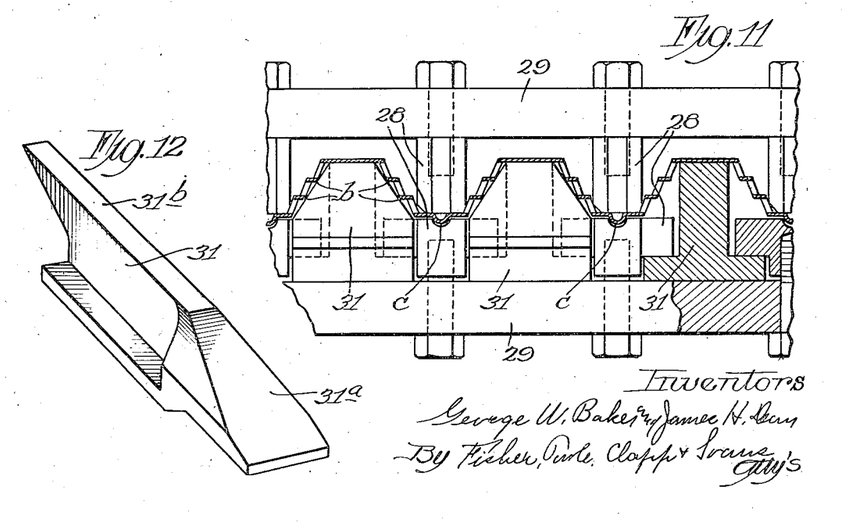
Fig. 11 is an end elevation, partially in section, of the guiding devices shown in Fig. 10.
Fig. 12 is a perspective view of one of the expanding guides or deflectors.
Figure 14:
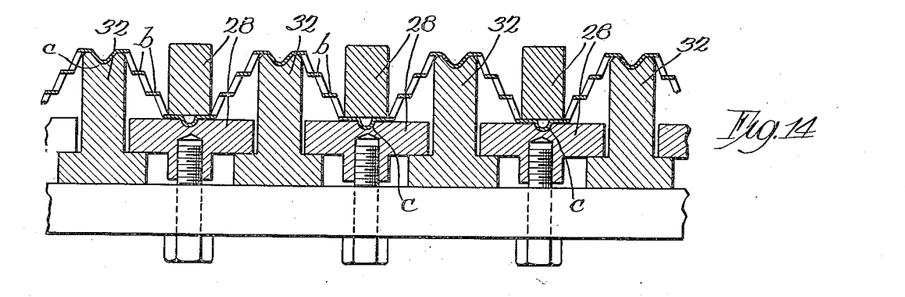

As shown in Fig. 6, the guides 26 are secured directly to the cross supports. As shown in Fig. 8, the guides 27 are connected to the cross supports by clamps 27$^a$. As shown in Figs. 11 and 14, the guides 28 are bolted directly to the cross supports and the lower rails of these guides constitute clamps for securing the deflecting and guiding devices 31 and 32 in position. The deflecting devices 31 (see Fig. 4) are arranged between the pairs of rolls 3 and 4, and the guiding devices 32 between the pairs of rolls 4 and 5. These deflectors and guides have lower portions only.

Figure 7:
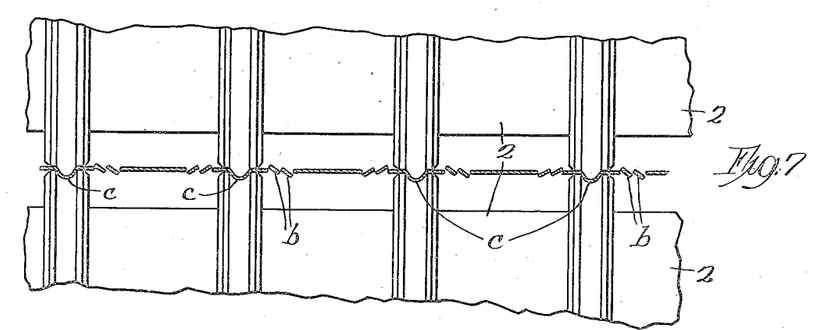
Figs. 7, 8, and 9 are detail views illustrating the operation of the rolls for feeding the sheet and beading or ribbing the odd-numbered strips and of the intermediate guides.
Figure 19:
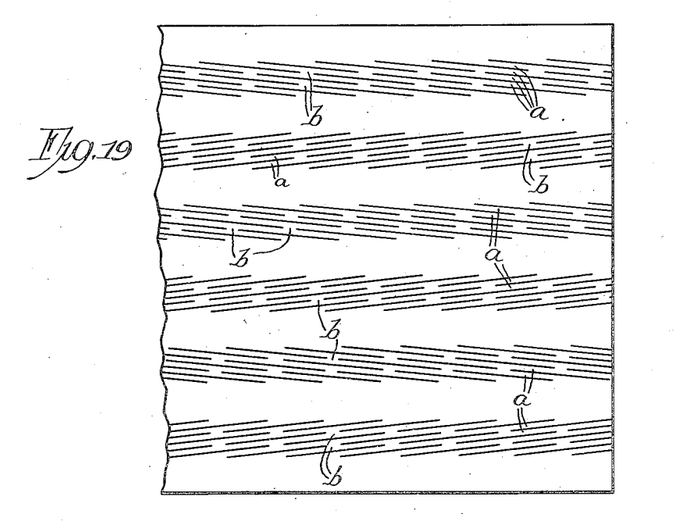
Fig. 19 illustrates a portion of the slitted sheet.

The metal sheets are first cut or slashed in longitudinal panels, preferably by means of roller dies such as shown in the Patent of James H. Dean, No. 1,664,247, dated March 27, 1928, to provide short rows of inclined slits that form strands $a$ (see Fig. 19) between the rows of slits with integral connecting bonds $b$ between the slits of each row, such bonds being staggered; that is to say, the bonds of each row are opposite the slits in the adjacent rows. It is also noted that, preferably as shown, the slitted panels or strips are of substantially the same width and may be even less than the width of the unslitted strips. It is also noted that the unslitted and slitted strips extend longitudinally of the sheet and the bonds and strands of adjacent slitted panels are oppositely inclined. The slitting of the sheets deflects portions of the strands and bonds from the original plane of the sheet and preferably the feed rolls 1, at front of the machine which initially engage the sheet, are so adjusted that they at least partially flatten the slitted sheet. As shown, the rolls 1 are preferably solid. The rolls 2 and 3 are made up of disks and collars mounted on central cores or shafts and the disks are provided with ribs and grooves (see Figs. 7 and 9) which are arranged respectively to partially form and then complete longitudinally extending central beads $c$ in the marginal and the alternate odd-numbered strips of the sheet as the latter passes through the rolls 2 and 3, as shown in Figs. 7 and 8. Guides 26 between the plain feed rolls 1 and the strip beading rolls 2 are provided with portions forming passes for the marginal and alternate odd-numbered strips. Similarly the guides 27 and 28 extending between the rolls 2 and 3 and between the rolls 3 and 4 respectively, provide guiding passes for the odd-numbered strips and the lower rails of these guides are grooved as shown in Figs. 8, 11, 16 and 17, to receive the beads $c$ of the sheets, the upper rails of these guides serving to hold the strips in position and prevent the disengagement of the beads from the guides.

Figure 10:
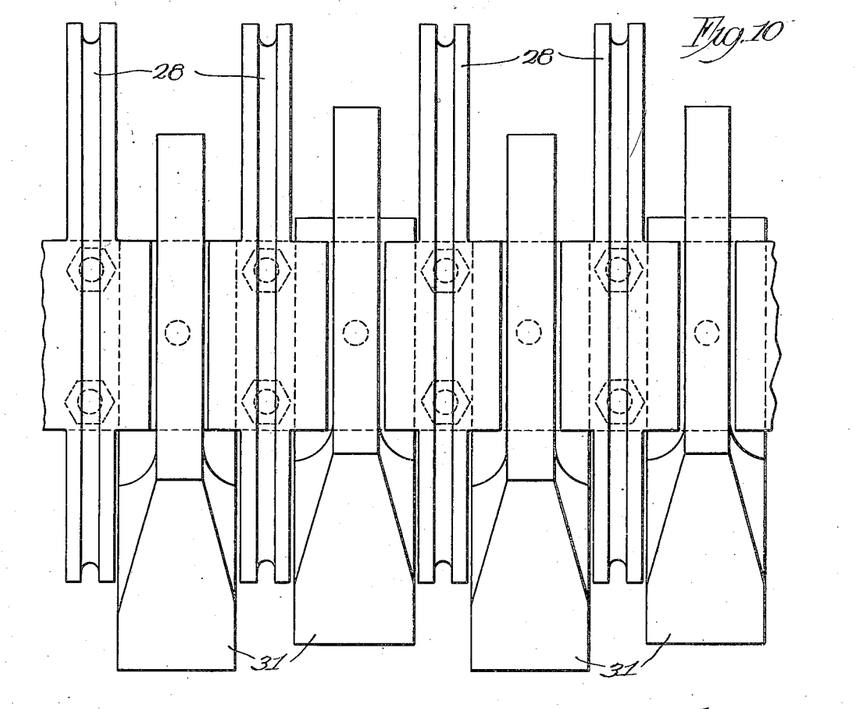
Fig. 10 is a plan view of the deflecting and guiding devices for effecting the expansion of the slitted panels.

As the odd-numbered strips pass through the guides 28, the intermediate or even-numbered strips and the slitted panels are deflected from the original plane of the sheet by the inclined deflectors or expanding guides 31. The series of deflectors, as shown in Fig. 10, are preferably staggered and are provided with inclined sheet engaging faces 31$^a$ which are preferably wide enough at their forward ends to overlap one of the even-numbered strips and the two adjacent slitted panels. These faces taper to a width substantially equal or slightly less than that of the unslitted strips and merge into horizontal guiding faces 31$^b$ over which the unslitted strips pass and are thereby guided into the passes of the rolls 4. By means of these deflecting guides the plain, unbeaded strips of the sheet are deflected first into longitudinally inclined planes and then into horizontal planes, while the slitted panels are guided first into longitudinally inclined planes as they engage the upwardly inclined faces 31ª of the deflectors (see Fig. 20) and then into oppositely and transversely inclined planes, as they pass over the inclined edges of these faces (see Fig. 11).

Figure 20:
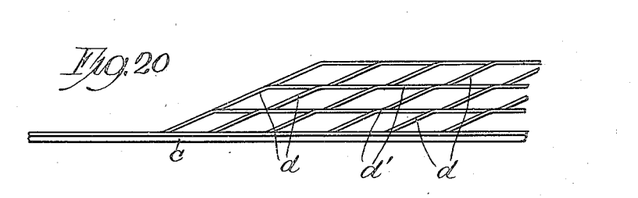
Fig. 20 is a side elevation of a portion of the sheet as it is expanded.
Figure 21:
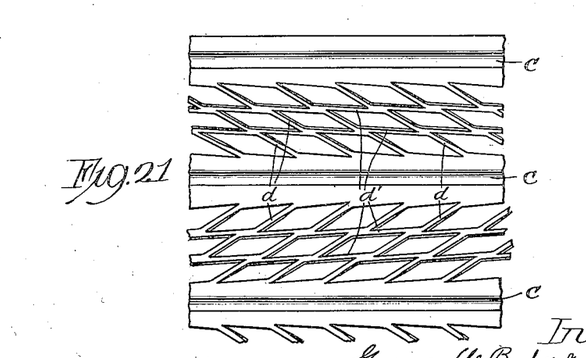
Fig. 21 illustrates a portion of the finished sheet.

As shown in Fig. 20, the slitted panels are expanded into diamond mesh having diagonal strands d extending at a very acute angle between the unslitted strips and connecting strands d' extending substantially parallel with the unslitted strips. The inclination of the diagonal strands is determined by the longitudinal inclination of the deflecting or expanding guides 31, and in the preferred form shown, this angle is very acute being only about 25 degrees. The expansion of the mesh sections is effected by bending the connecting strands d' between each two adjacent diagonal strands d, as the connecting strands pass from the longitudinally inclined planes determined by the inclined faces of the deflecting guides 31 into the transversely, oppositely inclined planes determined by the horizontal faces 31ᵇ of the deflecting devices and the guides 28, this expansion being effected, as stated, by bending and without any material stretching of the strands. Preferably, to insure uniformity of expansion, the side edges of the triangular faces 31ª of the deflecting guides are so disposed that all portions of each diagonal strand d pass over one of said edges at the same time. In other words, the portion of each slitted panel which forms a diagonal row of meshes between two diagonal strands d is first deflected into a longitudinally inclined plane as it passes on to the face 31ª of the expanding or deflecting guide, and is then expanded and deflected into a transversely inclined plane as it passes over one of the inclined edges of this triangular face. It is also noted that the inclined faces of these deflecting guides are preferably so located that they engage the portions of the sheets between the ribbed or beaded odd-numbered strips as the latter leave the passes of the rolls 3.

Like the rolls 2 and 3, the rolls 4 and 5 are made up of spacing collars and disks mounted on central shafts or cores and the disks thereof are provided with ribs and grooves for first partially forming and then completing central beads c in the even-numbered strips after the latter have passed the deflecting or expanding devices, these strips being suitably guided to the rolls 4 and 5 by the horizontal portions of the deflecting guides 31 and by the guides 32 respectively.

Figure 13:
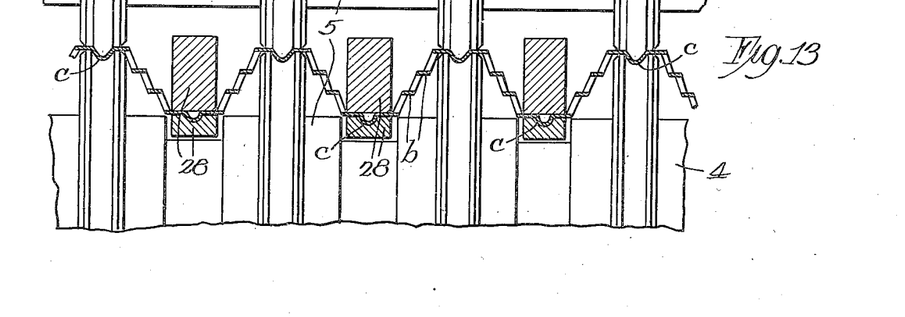
Figs. 13 to 18 inclusive, are detail cross sections on the correspondingly numbered lines of Fig. 4, illustrating the operation of the parts of the machine upon the metal sheet after the panels thereof have been expanded.
Figure 15:
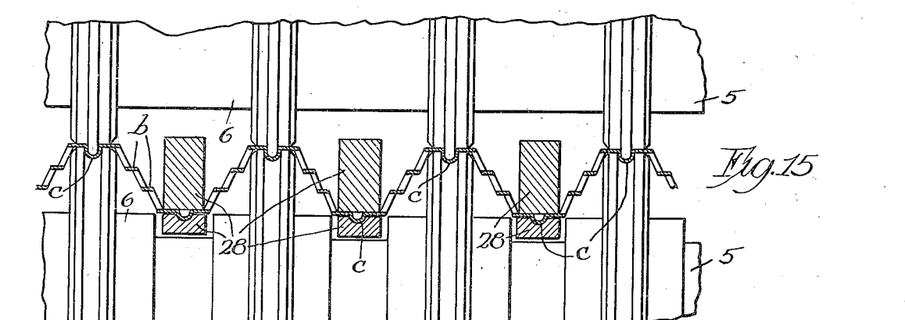

By ribbing or beading the odd-numbered strips prior to expansion and engaging these beaded strips with the grooved guides 28 during expansion, the sheets are readily controlled and the machine can be operated at very high speeds. The control of the sheets is also aided by maintaining the beaded strips by means of the guides 27 and 28 in the original plane of the sheet throughout the expanding and subsequent spreading or flattening operations. Preferably, as shown, to effectively prevent displacement of the sheet during these operations, the guides 28 are continuous and for this reason the upper ribbing rolls 4 and 5 are provided with passes (see Figs. 13 and 15) through which the lower rails of the guides 28 extend.

Figure 16:
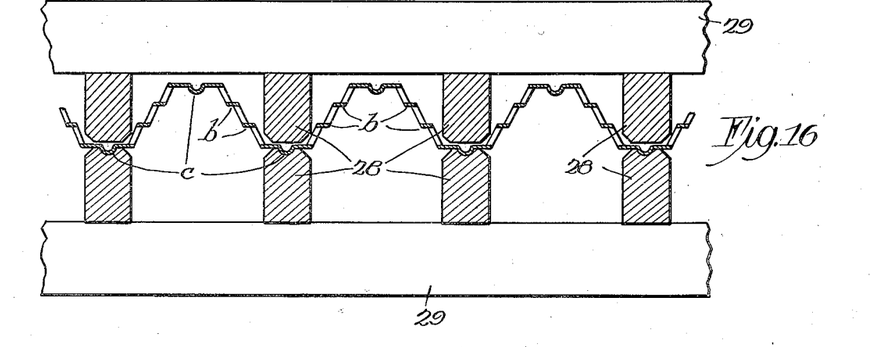
Figure 17:
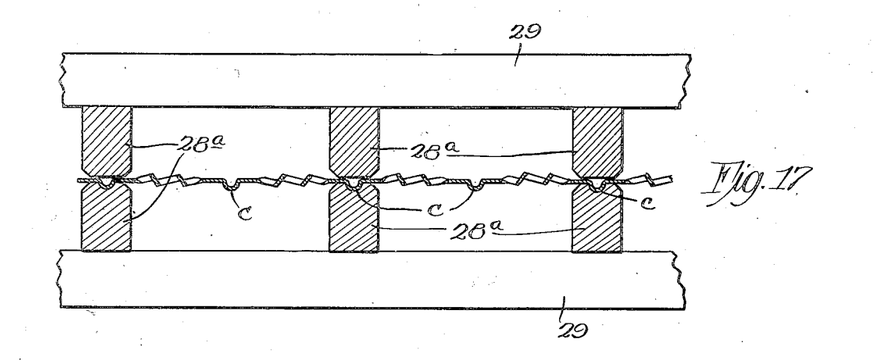

Beyond the second set of ribbing rolls the guides 28, while maintaining each sheet in its original plane, diverge laterally (see Fig. 1) to spread the odd-numbered strips and flatten the sheet. Fig. 16 shows the sheet as it enters the divergent portions 28ª of the guides, and Fig. 17 shows the sheet as it passes through the widest portion of these guides.

From the divergent guides, the sheet passes through the feeding and setting rolls 6 which, like the ribbing rolls, are made up of disks and collars mounted on central shafts or cores, the disks being provided with ribs and grooves for engaging the beaded strips. Preferably to aid the rolls in bringing the odd-numbered strips of the flattened sheet into parallel relation, the divergent portions of the guides 28 terminate some distance in advance of the rolls 6, so that the portions of these guides immediately in advance of these rolls are parallel as shown in Fig. 1. It is noted that no vertical pressure is exerted on the even-numbered strips or the panels during the flattening operation. If such pressure is exerted, it will also tend to collapse the mesh.

Figure 18:
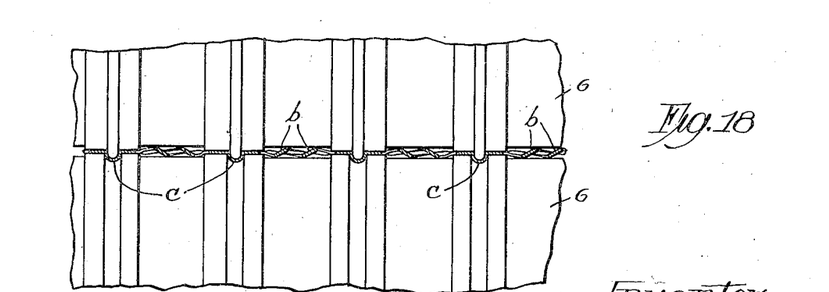

The collar portions of the rolls 6 between the disks thereof are of such size that they engage the bonds of the expanded panels and twist or force them toward the general plane of the sheet so that the strands and bonds of the expanded mesh sections are partially flattened. When the panels are expanded, as described, even though the expansion is slight, the bonds and strands occupy a position that is inclined at a considerable angle to the planes of the expanded panels. Thus, when the mesh sections of the sheet and the extent of expansion are substantially as herein set forth, the bonds and strands are at an angle of inclination of about 60 degrees to the general planes of the panels when the mesh sections thereof are expanded, as shown in Fig. 16. Then, when the odd-numbered strips are spread and the sheet flattened to bring the strips and panels into a common general plane, the portions of the diagonal strands that merge into the flat edge flanges of the centrally beaded strips are necessarily twisted, but the remaining portions of the bonds and strands are still inclined at a considerable angle to the general plane of the sheet, but only at such an angle that they can be twisted by the enlarged collar portions of the rolls 6 toward the general plane of the sheet, as shown in Fig. 18, so that they will be inclined at a much smaller angle to such plane. The disks of the rolls 6 which engage the strips are sufficiently wide, as shown in Fig. 18, to engage the end portions of the diagonal strands of the expanded panels, and so roll them substantially flat or substantially in to the plane of the flat edge flanges of the centrally beaded strips. That is to say, the portions of the diagonal strands that merge into the flat edge flanges of the beaded strips are brought substantially into the plane of these flanges. During the twisting or flattening of the bonds and strands, the sheet is held by the engagement of the ribbed and grooved disks of the rolls 6 so that this operation is effected without changing the width of the expanded sheet.

From the rolls 6 the sheet passes to the set of staggered leveling rolls 7. The latter rolls are provided with surfaces, not only for engaging the ribbed strips, but also for engaging the mesh sections of the expanded panels. In the particular machine shown, these rolls have smooth, cylindrical surfaces, except that the lower rolls are provided with grooves through which the beads of the strips pass. With leveling rolls of this sort, not only are the ribbed strips straightened and set, but there is an additional leveling and setting of the bonds and strands.

Figure 9:
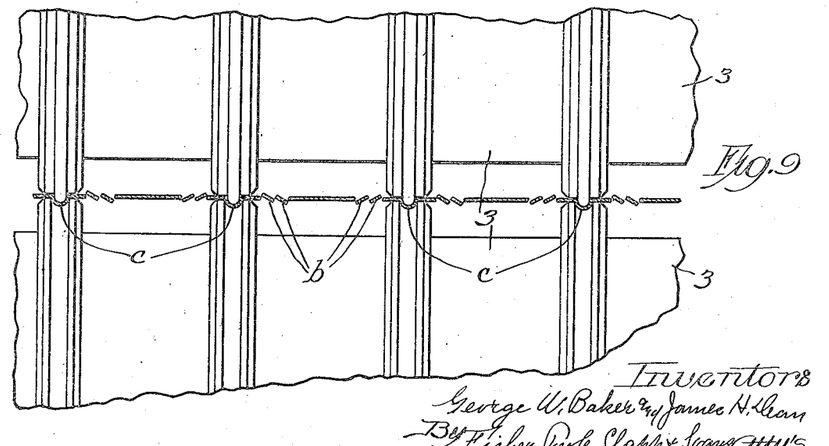

It is noted that in the views illustrating the different steps and in which the metal is shown in section, such sections are taken through the bonds, which are of course twice the width of the strands. The initial beading of the alternate strips by the rolls 2 and 3 slightly opens the slits between the strands and bonds, as indicated in Figs. 7, 8, and 9, but this opening of the slits is not sufficient to materially stretch or weaken the strands. The expansion of the panels effected by the sets of fixed guides 28 and 31, which are relatively divergent in a vertical direction or transversely of the plane of the sheet, does not stretch the sheet. Instead, as stated, the opening of the mesh sections is effected by the bending of the connecting strands of the mesh sections, so that light metal and high operating speeds may be employed.

It is also noted that in the narrow expanded panels there are preferably only three diamonds or meshes in each of the mesh sections between two adjacent diagonal strands and, although effected without shortening the strips or the panels or stretching the strands, the expansion of the narrow panels is such that there is no material distortion of the sheet. Instead the finished sheets have substantially square ends that require no trimming. It is further noted that the mesh of the panels is so proportioned and expanded that narrow, elongated, diamond-shaped openings are formed; also that the mesh comprises connecting strands substantially parallel to the strips and acutely inclined diagonal strands having end portions merging into and substantially in the plane of the flat flanges of the strips, and that the bonds and strands in the finished sheet are inclined at a slight angle to the general plane of the sheet, and preferably of only about 30 degrees in the average. When this improved metal is employed as metal lath, it is found in practice that, while ample interlocking of the plaster with the lath is effected, very little excess plaster is forced through the mesh by the troweling operation so that a very marked saving is effected.

In the expanding and sheet flattening operations, the sheets are effectively controlled and held against displacement by the engagement of the grooved guides 28 with the initially beaded marginal and alternate odd-numbered strips of the sheets, and, as stated, the guides maintain the beaded strips in the original plane of the sheet throughout the expanding and flattening operations. It is also noted that the flattening operation is effected by the laterally divergent portions of these guides with traction or feeding rolls only at the opposite ends of such divergent portions. As the sheet is flattened the end portions of the diagonal strands that merge into the flat edge flanges of the strips are slightly twisted, and these twisted portions are flattened as described and the strands and bonds are forced or twisted back toward the general plane of the sheet by the rolls 6. This twisting or partial flattening of the bonds and strands, is accomplished without reducing the width of the sheet and without materially reducing its stiffness, and it has a marked effect on the plaster saving quality of the product.

If desired, the odd-numbered strips of the sheet may be made wider and the even-numbered strips narrower, as shown in Fig. 9 of the Dean Patent No. 1,664,247 above referred to, and the wide odd-numbered strips more deeply beaded or ribbed. The sheet will then be sufficiently stiff without beading the intermediate narrow strips. Or, if desired, some of the beads may be formed into ribs without changing the widths of the strips. In either case, such ribbing of the strip may serve to partially flatten the expanded sheet.

Other changes may be made in the details set forth without departure from the scope of the invention as defined in the appended claims.

We claim as our invention:

1. The method of expanding metal sheets slitted in longitudinal panels disposed between unslitted strips and having rows of staggered slits oppositely inclined in adjacent panels, which consists in longitudinally beading the marginal and the alternate unslitted strips of the sheet, then, while maintaining the beaded strips in the original plane of the sheet, progressively deflecting the intermediate unslitted strips and the slitted panels from such plane to transversely incline and expand the panels, and then, and while maintaining the intermediate unslitted strips free from pressure, laterally spreading the initially beaded strips to flatten the sheet, substantially as described.

2. The method of expanding metal sheets slitted in longitudinal panels disposed between unslitted strips and having rows of staggered slits oppositely inclined in adjacent panels, which consists in longitudinally beading the marginal and the alternate unslitted strips of the sheet, then, while maintaining the beaded strips in the original plane of the sheet, progressively deflecting the other portions of the sheet from such plane to transversely incline and expand the slitted panels, then longitudinally beading the intermediate strips and then laterally spreading the initially beaded strips to flatten the sheet, substantially as described.

3. The method of expanding metal sheets slitted in longitudinal panels disposed between unslitted strips and having rows of staggered slits oppositely inclined in adjacent panels, which consists in longitudinally beading the marginal and the alternate unslitted strips of the sheet, then, while maintaining the beaded strips in the original plane of the sheet, progressively deflecting the intermediate unslitted strips and the panels from such plane to transversely incline and expand the panels, and then and while maintaining the intermediate unslitted strips free from pressure, laterally spreading the initially beaded strips to flatten the sheet, and finally applying pressure to the strands and bonds of the expanded panels to partially flatten the same, substantially as described.

4. The method of expanding metal sheets slitted in longitudinal panels disposed between unslitted strips and having rows of staggered slits oppositely inclined in adjacent panels, which consist in longitudinally beading the marginal and the alternate unslitted strips of the sheet, then, while maintaining the beaded strips in the original plane of the sheet, progressively deflecting the other portions of the sheet from such plane to transversly incline and expand the slitted panels, then longitudinally beading the intermediate strips, then laterally spreading the initially beaded strips to flatten the sheet, and finally rolling the strips and panels to set the same and partially flatten the strands and bonds of expanded panels without reducing the width of the sheet, substantially as described.

5. The method of expanding metal sheets slitted in longitudinal panels disposed between unslitted strips and having strands and staggered connecting bonds oppositely inclined in adjacent panels, which consists in longitudinally beading the central portions of the marginal and the alternate unslitted strips of the sheet, then, while engaging and longitudinally advancing the beaded strips in the original plane of the sheet, progressively deflecting the diagonal portion of panels first into longitudinally and then into transversely and oppositely inclined planes to expand the panels, by bending and without stretching the strands, into diamond mesh with the strands thereof extending at an acute angle and substantially parallel respectively to the strips, laterally deflecting the beaded strips to flatten the sheet and twisting the bonds and strands of the expanded panels toward the plane of the centrally beaded strips without reducing the width of the expanded panels, substantially as described.

6. The method of expanding metal sheets slitted in longitudinal panels disposed between unslitted strips and having strands and staggered connecting bonds oppositely inclined in adjacent panels, which consists in longitudinally beading the central portions of the marginal and the alternate unslitted strips of the sheet, then, while engaging and advancing the beaded strips in the original plane of the sheet, progressively deflecting the intermediate strips into a parallel plane and the panels into transversely and oppositely inclined planes to expand the latter by bending and without stretching the strands thereof, then centrally beading the intermediate strips, and then, and while leaving the panels and intermediate strips unsupported, transversely deflecting the initially beaded strips to flatten the sheet, substantially as described.

7. The method of expanding metal sheets slitted in longitudinal panels to form strands and staggered connecting bonds oppositely inclined in adjacent panels, which consists in longitudinally beading the central portions of the marginal and the alternate unslitted strips of the sheet, then, while engaging and advancing the beaded strips in the original plane of the sheet, progressively deflecting the intermediate strips into a parallel plane and the panels into transversely and oppositely inclined planes to expand the latter by bending and without stretching the strands thereof, then centrally beading the intermediate strips, then, and while leaving the panels and intermediate strips unsupported, transversely deflecting the initially beaded strips to flatten the sheet, and finally rolling the beaded strips and the expanded panels to set the same and partially flatten the transversely inclined bonds and strands without reducing the width of the sheet, substantially as described.

8. The method of forming expanded metal sheets previously slitted in panels to form strands and staggered connecting bonds oppositely inclined in adjacent panels, which consists in progressively deflecting each two adjacent panels from a common plane into transversely and oppositely inclined planes to expand the panels, by bending and without stretching the strands, into diamond mesh with the strands thereof extending substantially parallel and at an acute angle respectively to the unslitted strips, then flattening the sheet and partially flattening the strands and bonds without reducing the width of the expanded panels, substantially as described.

9. The method of forming expanded metal sheets previously slitted in panels disposed between unslitted strips and having strands and staggered connecting bonds oppositely inclined in adjacent panels, which consists in longitudinally beading the central portions of the marginal and the alternate unslitted strips of the sheet, then, while engaging and continuously and longitudinally advancing the beaded strips in a common plane, deflecting the intermediate strips into a parallel common plane to expand the panels, then longitudinally beading the central portions of the intermediate strips, and then, while leaving the panels and intermediate strips unsupported, laterally diverging the initially beaded strips to flatten the sheet, substantially as described.

10. The method of expanding metal sheets slitted in narrow, longitudinal panels to form rows of strands and staggered connecting bonds oppositely inclined in adjacent panels and with marginal and intermediate unslitted strips of substantially the same width as the panels, which consists in longitudinally beading the strips, deflecting the panels into transversely and oppositely inclined planes to expand the same by bending and without stretching the strands and without shortening the unslitted strips, bringing the edge portions of the beaded strips into a common plane with the bonds and strands lying in planes inclined at an acute angle to such common plane, and rolling the strips and panels to twist the bonds and strands toward the plane of the flanged edges of the strips to partially flatten the bonds and strands, substantially as described.

11. The method of expanding metal sheets slitted in narrow, longitudinal panels disposed between unslitted strips and having rows of strands and staggered connecting bonds oppositely inclined in adjacent panels, which consists in longitudinally beading the central portions of the unslitted strips of the sheet and deflecting the panels into transversely and oppositely inclined planes to expand the same, flattening the sheet and twisting the bonds and panels toward the plane of the sheet to partially flatten the bonds and strands and force the portions of the diagonal strands that merge into the planes of the edge portions of the beaded strips substantially into such planes, substantially as described.

12. The method of expanding metal sheets slitted in narrow, longitudinal panels disposed between unslitted strips and having rows of strands and staggered connecting bonds oppositely inclined in adjacent panels, which consists in longitudinally beading the central portions of the unslitted strips of the sheet and deflecting the panels into transversely and oppositely inclined planes to expand the same, flattening the sheet and then rolling the same to partially flatten the bonds and strands without reducing the width of the sheet and to force the end portions of the diagonal strands of the sheet substantially into the plane of the edge flanges of the beaded strips, substantially as described.

13. Apparatus for expanding metal sheets having longitudinal beaded strips and oppositely inclined rows of strands and staggered bonds arranged in panels between the beaded strips, including rolls and cooperating fixed guides for engaging and maintaining the beaded strips in common planes and the rolls serving to continuously advance the sheet, and a series of fixed expanding devices for progressively deflecting the portions of the sheet between the beaded strips to expand the panels, said fixed guides having parallel portions extending past said expanding devices, and laterally divergent portions for flattening the sheet, substantially as described.

14. Apparatus for expanding metal sheets having longitudinal beaded strips and oppositely inclined rows of strands and staggered bonds arranged in panels between the beaded strips, including rolls and cooperating fixed guides for engaging and maintaining the beaded strips in common planes and the rolls serving to continuously advance the sheet, a series of fixed deflecting devices cooperating with said guides to expand the panels, said fixed guides having parallel portions extending past said deflecting devices and divergent portions for flattening the sheet, and roller means for withdrawing the sheets from said guides, substantially as described.

15. Apparatus for expanding metal sheets having longitudinal beaded strips and oppositely inclined rows of strands and staggered bonds arranged in panels between the beaded strips, including rolls and cooperating guides for engaging and maintaining the beaded strips in common planes and the rolls serving to continuously advance the sheet, deflecting devices for expanding the panels as the sheet is advanced, and rolls having portions for engaging the strips and the panels to withdraw the sheets from said guides and to twist the strands and bonds toward the plane of the sheet, substantially as described.

16. Apparatus for expanding metal sheets having oppositely inclined rows of strands and bonds arranged in longitudinal, spaced panels, including rolls for initially and centrally beading the marginal and the alternate strips of the sheet, fixed parallel guides for receiving the beaded strips from said rolls and maintaining the same in the original plane of the sheet, a series of longitudinally inclined, fixed deflecting devices between said guides for directing the intermediate strips away from such plane to expand the panels, laterally divergent guides in the plane of said parallel guides for engaging and spreading the beaded strips and flattening the sheet, and rolls for withdrawing the sheet from the divergent guides, setting the strips and panels and for rolling the bonds and strands toward the plane of the sheet and the ends of the diagonal strands into such plane, substantially as described.

17. Apparatus for expanding metal sheets having oppositely inclined rows of strands and bonds arranged in longitudinal, spaced panels, including rolls for initially and centrally beading the marginal and the alternate strips of the sheet, fixed parallel guides for receiving the beaded strips from said rolls and maintaining the same in the original plane of the sheet, a series of longitudinally inclined, fixed deflecting devices between said guides for directing the intermediate strips away from such plane to expand the panels, rolls for receiving the intermediate strips from said deflecting devices and for longitudinally beading the same, and a series of divergent guides for engaging and spreading the initially beaded strips and flattening the sheet, substantially as described.

18. Apparatus for expanding metal sheets having oppositely inclined rows of strands and bonds arranged in longitudinal, spaced panels, including rolls for initially and centrally beading the marginal and the alternate strips of the sheet, fixed parallel guides for receiving the beaded strips from said rolls and maintaining the same in the original plane of the sheet, a series of longitudinally inclined, fixed deflecting devices between said guides for directing the intermediate strips away from such plane to expand the panels, laterally divergent guides in the plane of said parallel guides for engaging and spreading the beaded strips and flattening the sheet, said divergent guides having parallel terminal portions, and feed rolls for engaging the beaded strips as they emerge from the terminal portions of said divergent guides, substantially as described.

19. Apparatus for expanding previously slitted sheets having oppositely inclined rows of strands and staggered bonds arranged in longitudinal, spaced panels, two sets of successively acting rolls for ribbing the strips of the sheet and continuously advancing the sheet in longitudinal direction, two sets of fixed guides, one arranged to engage the initially ribbed strips and maintain the same in the original plane of the sheet and the other having longitudinally inclined portions between the two sets of rolls for deflecting the intermediate strips and expanding the panels, and means for engaging and laterally spreading the initially ribbed strips to flatten the sheet, substantially as described.

20. Apparatus for expanding previously slitted sheets having oppositely inclined rows of strands and bonds in longitudinal, spaced panels, including two sets of successively acting rolls for respectively ribbing the alternate strips of the sheet, guides for receiving the initially ribbed strips from the first set of ribbing rolls and for maintaining the same in the original plane of the sheet, and devices between the two sets of rolls for deflecting the intermediate unribbed strips of the sheet and expanding the panels, said guides extending continuously through the second set of ribbing rolls and having laterally divergent portions for spreading the initially ribbed strips and flattening the sheet, substantially as described.

21. Apparatus for expanding previously slitted sheets having rows of strands and bonds arranged in longitudinally spaced panels between marginal and intermediate unslitted strips and having rows of strands and bonds oppositely inclined in adjacent panels, including feed rolls for engaging the unslitted strips of the sheet and continuously advancing the same in longitudinal direction, two sets of fixed guides arranged in alignment transversely of the path of movement of the sheet and arranged to engage the odd and even numbered unslitted strips respectively, said sets of fixed guides having relatively divergent portions for directing the alternate unslitted strips of the sheet into two parallel spaced planes with each panel disposed in a single transversely inclined plane and with adjacent panels oppositely inclined to thereby expand the panels, and means for flattening the sheet, substantially as described.

22. Apparatus for expanding sheets having slitted panels and unslitted strips, comprising pairs of horizontal rolls for beading the strips and longitudinally advancing the sheet, cooperating strip guides having relatively divergent portions for guiding the alternate strips into two parallel spaced planes to expand the panels, a bed plate whereon the lower rolls of each pair and the guides are mounted and a head hinged to one side of said bed plate whereon the upper rolls are mounted, substantially as described.

23. Apparatus for expanding sheets having slitted panels and unslitted strips, comprising pairs of horizontal rolls for beading the strips and longitudinally advancing the sheet, cooperating strip guides having relatively divergent portions for guiding the alternate strips into two parallel spaced planes to expand the panels, a bed plate, brackets on said bed plate whereon the lower rolls of each pair and said guides are mounted and a head hinged at one side to said bed plate whereon the upper rolls are mounted, said bed plate, brackets and head forming a housing for said rolls and guides, substantially as described.

24. Apparatus for expanding metal sheets having oppositely inclined bonds and strands in adjacent longitudinal panels, sets of successively acting rolls for feeding the sheet longitudinally and centrally beading alternate and intermediate strips of the sheet respectively, strip guides having relatively divergent portions between the sets of beading rolls for expanding the mesh sections of the sheet, means for flattening the sheet, and sets of feeding and leveling rolls arranged to engage the beaded strips and the expanded panels of the flattened sheet to set and level the same and partially flatten the bonds and strands without changing the width of the sheet, substantially as described.

25. The method of forming expanded sheet metal lath from sheets slitted in narrow, longitudinal panels to form rows of strands and staggered connecting bonds oppositely inclined in adjacent panels, which consists in continuously advancing the sheet and progressively deflecting the side edges of each slitted panel to expand the same by bending and without stretching the strands thereof and finally rolling the sheets to partially flatten the bonds and strands of the expanded panels without reducing the widths thereof.

26. The method of forming expanded metal lath from metal sheets slitted in narrow, longitudinal panels to form rows of strands and staggered connecting bonds oppositely inclined in adjacent panels, which consists in continuously advancing the sheets and progressively deflecting the side edges of each panel to expand the same by bending and without stretching the strands thereof, bringing the edge portions of the unslitted strips into a common plane and rolling the expanded panels to twist the bonds and strands of the expanded panels toward the common plane of the edge portions of the strips without reducing the widths of the expanded panels.

27. The method of forming expanded metal lath from sheets slitted in narrow, longitudinal panels to form rows of strands and staggered connecting bonds oppositely inclined in adjacent panels, which consists in continuously advancing the sheet and progressively deflecting the side edges of each panel to expand the same by bending and without stretching the strands thereof, bringing the edge portions of the unslitted strips into a common plane and finally rolling the sheets to partially flatten the bonds and strands of the expanded panels without reducing the widths thereof and to force the end portions of the diagonal strands of the panels substantially into the common plane of the edge portions of the unslitted strips.

GEORGE W. BAKER.
JAMES H. DEAN.